Jan. 29, 1952  W. A. KEETCH  2,583,947
HANDLE BAR MOUNTING
Filed Nov. 13, 1948
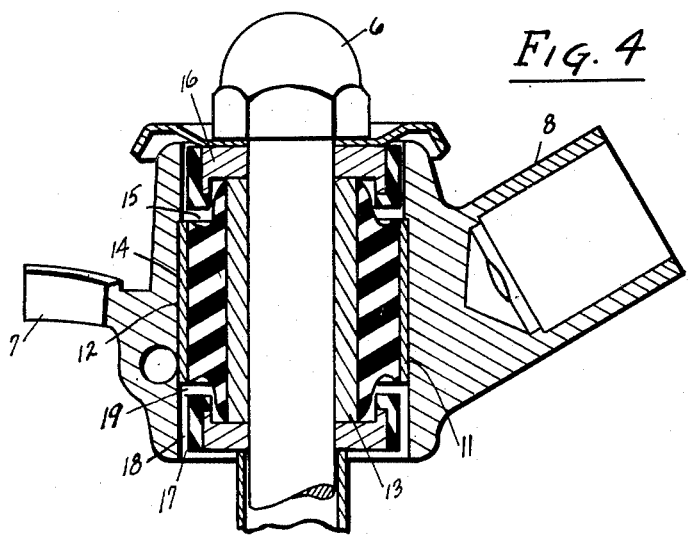
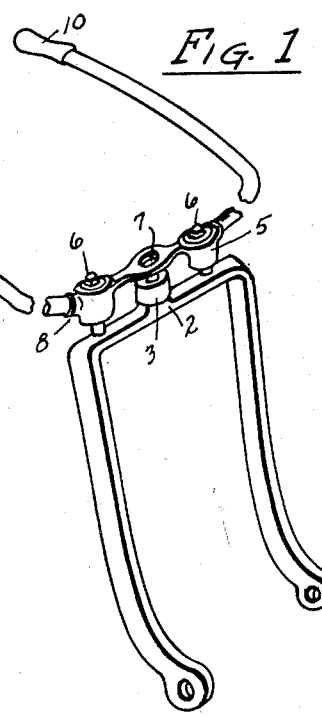
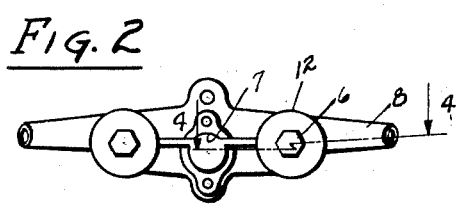
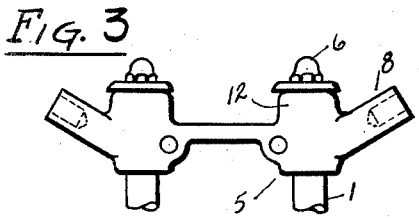
Inventor
William A. Keetch
By Ralph Hammar
Attorney Patented Jan. 29, 1952

2,583,947

UNITED STATES PATENT OFFICE 2,583,947

HANDLE BAR MOUNTING

William A. Keetch, Erie, Pa., assignor to Lord Manufacturing Company, Erie, Pa., a corporation of Pennsylvania Application November 13, 1948, Serial No. 59,923

2 Claims. (Cl. 74—551.2)

In motorcycles the vibration transmitted to the hand grips is an objectionable source of fatigue This invention is intended to isolate vibration from the hand grips by a handlebar mounting having small resistance to movement in the vibration range and an increased resistance to movement beyond the vibration range during steering. Further objects and advantages appear in the specification and claims.

In the drawing, Fig. 1 is a perspective of a motorcycle fork and handlebar, Fig. 2 is a top view of the handlebar bracket, Fig. 3 is a rear view of the handlebar bracket and Fig. 4 is a section on line 4—4 of Fig. 2.

In the drawing, 1 diagrammatically indicates a motorcycle fork having spindle 2 journalled in a hub 3 forming part of the motorcycle frame. Above the motorcycle fork is a handlebar bracket 5 having bolts 6 connected to the fork on either side of the spindle, a clearance opening 7 providing access to the upper end of the spindle, and sockets 8 receiving handlebars 9 provided with hand grips 10. These parts are or may be of common construction.

In the operation of the motorcycle, vibrations such as those due to road shock are transmitted through the fork and unless isolated from the hand grips cause objectionable fatigue. In the present construction these vibrations are isolated from the hand grips by tube form mountings 11 clamped in sockets 12 in the handlebar bracket. These tube form mountings extend in the same general direction as the fork and comprise inner metal sleeves 13 surrounding the bolts 6 and outer metal sleeves 14 clamped in the sockets 12. The sleeves 13 and 14 are bonded to the inner and outer surfaces of a bushing 15 of rubber or equivalent resilient material. At the ends of the inner sleeves 13 are washers 16 which when the bolts 6 are tightened are clamped rigidly against the ends of the sleeves 13. At the edges of the washers 16 are bonded rubber rims 17 which have snubbing clearances 18 and 19 with the side walls of the sockets 11 and with the ends of the rubber bushing 15. The clearances 18 and 19 are sufficient to permit relative movement of the sleeves 13 and 14 incident to normal vibration. As shown in Fig. 1 the hand grips 10 are offset both vertically and horizontally from the mountings. Under straight away driving conditions when the operator's hands are merely lightly rested upon the hand grips the mountings occupy the position illustrated in which the mountings serve as a soft vibration isolating connection between the hand grips and the bolts 6 making the steering connection to the fork. Under steering forces whether consisting of horizontal forces applied to the hand grips or a combination of horizontal and vertical forces the handlebar bracket 5 is cocked relative to the bolts 6 taking up the clearances 18 and 19. Because the rubber rims 17 are much stiffer than the rubber bushing 15 the rubber rims 17 offer a greatly increased resistance which provides a desirable positive transmission of steering force to the fork. The clearances 18 and 19 are such that the more positive connection through the rubber rims 17 is outside the vibration range.

What I claim as new is:

1. A handlebar mounting comprising a pair of tube form mountings on opposite sides of the steering axis of the fork comprising inner and outer members anchored to an intermediate bushing of rubber or like resilient material, the longitudinal axis of such mountings extending in the general direction of the fork, one of the members of each mounting being fixed to the fork, a handlebar bracket fixed to the other of the members of each mounting, a handlebar carried by the bracket having grips offset vertically and laterally from the mountings whereby a thrust on the grips in any direction causes cocking of the mountings, and stops limiting the cocking of the mountings whereby a more positive steering force may be applied to the fork.

2. A handlebar mounting comprising a handlebar having a steering connection with a fork and hand grips for applying a steering force, a pair of tube form mountings on each side of the center of the handlebar and offset from the hand grips with respect to the line of action of a steering force, said mountings comprising inner and outer members anchored to an intermediate bushing of rubber or like resilient material and the longitudinal axis of such mountings extending in the general direction of the fork, one of the members being connected to the hand grips and the other of the members being connected to a part moved by the hand grips in steering, and stops limiting cocking of the mountings under steering forces to provide more positive steering.

WILLIAM A. KEETCH.

REFERENCES CITED

The following references are of record in the file of this patent:

UNITED STATES PATENTS

| Number | Name | Date |
|---|---|---|
| 1,834,308 | Harley | Dec. 1, 1931 |
| 2,198,731 | Lambert | Apr. 30, 1940 |
| 2,415,280 | Fink | Feb. 4, 1947 |
| 2,421,585 | Thiry | June 3, 1947 |
| 2,511,320 | Benson | June 13, 1950 |

FOREIGN PATENTS

| Number | Country | Date |
|---|---|---|
| 19,653 | Great Britain | Feb. 6, 1913 |
| 437,948 | Great Britain | Nov. 8, 1935 |
| 531,716 | Great Britain | Jan. 9, 1941 |
| 104,632 | Sweden | Mar. 26, 1942 |